C. W. LAMPRECHT.
PEEL PLATE FOR BAKING.
APPLICATION FILED APR. 29, 1920.
1,373,663.
Patented Apr. 5, 1921.
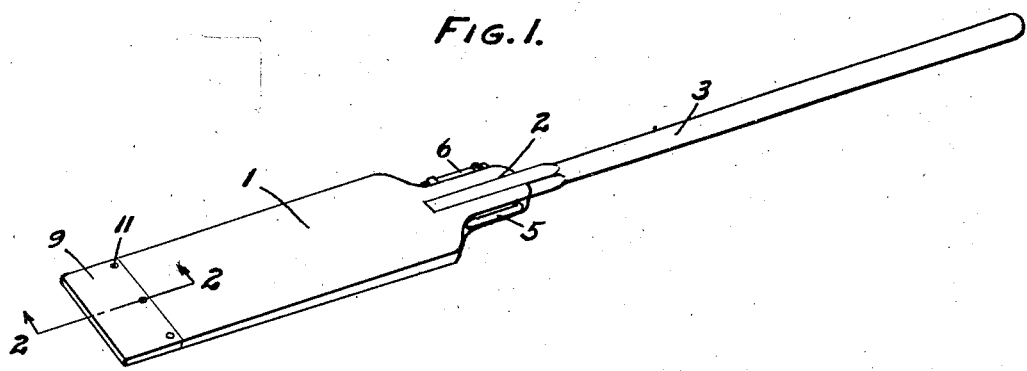
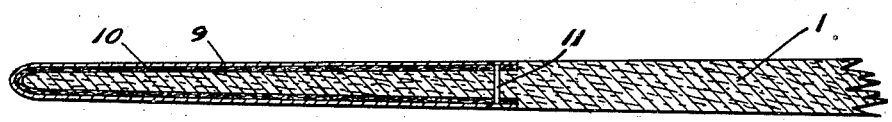
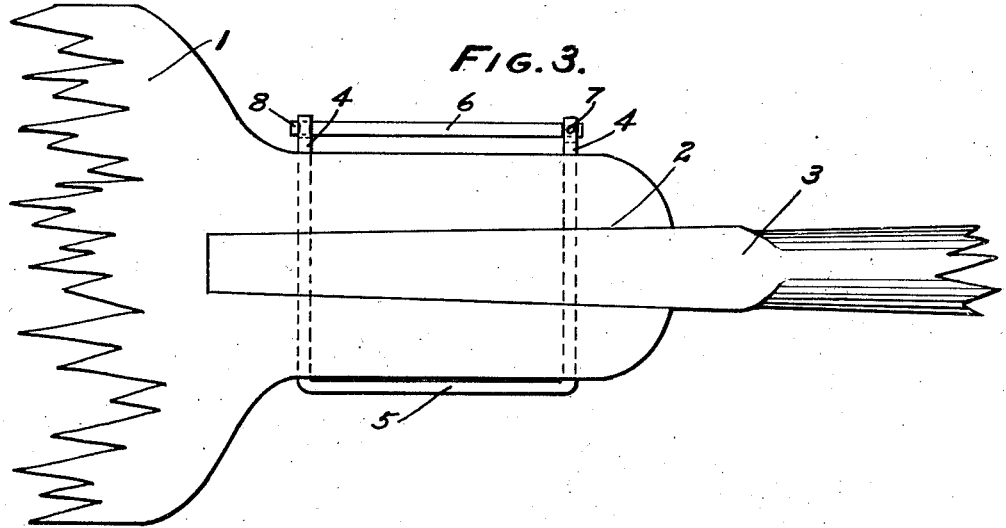
INVENTOR.
CARL W. LAMPRECHT
BY
*Hazard & Miller*
ATTORNEYS.

UNITED STATES PATENT OFFICE.

CARL W. LAMPRECHT, OF LOS ANGELES, CALIFORNIA, ASSIGNOR OF ONE-HALF TO JAMES L. GILBERT, OF LOS ANGELES, CALIFORNIA.

PEEL-PLATE FOR BAKING.

1,373,663.

Specification of Letters Patent.   Patented Apr. 5, 1921.

Application filed April 29, 1920. Serial No. 377,645.

*To all whom it may concern:*

Be it known that I, CARL W. LAMPRECHT, a citizen of Germany, residing at Los Angeles, in the county of Los Angeles and State of California, have invented new and useful Improvements in Peel-Plates for Baking, of which the following is a specification.

This invention is a peel plate for baking and has for its object the provision of reinforcing means upon a peel plate to prevent wearing of the plate and also to prevent burning of the same. The invention will be readily understood from the following description of the accompanying drawings, in which—

Figure 1 is a perspective view of a peel plate constructed in accordance with my invention.

Fig. 2 is a longitudinal section on the line 2—2 of Fig. 1, and

Fig. 3 is a top plan view of the handle connection for the peel plate.

The peel plate is shown as comprising a flat board 1 of usual shape and having a slotted end 2 arranged to receive the end of the handle 3. The end of the handle and the slot in which it is received are preferably tapered, as shown in Fig. 3, to provide for tight wedging connection between the handle and the peel plate. The handle is preferably removably held in position by rods 4 extending through suitable alined apertures in the handle end of the peel plate. These rods may be connected at one end by a cross rod 5 rigid with said rods and a swinging rod 6 is preferably provided at the opposite ends of the rods 4. This swinging rod 6 is shown as pivotally connected at 7 to one of the rods 4, the other end of the swinging rod being arranged to be engaged by a latch 8 at the end of the other cross rod 4. By this arrangement the handle is rigidly held in position relative to the peel plate and by swinging the rod 6 outwardly into longitudinal prolongation of the rod 4 the cross rods may be removed from the peel plate and thus permit removal of the handle. The reinforcing means provided upon the end of the peel plate preferably comprise a metallic strip 9 bent around the end of the peel plate and extending along the upper and lower sides thereof a suitable distance. A strip of material, such as asbestos, is preferably provided between the metallic strip and the peel plate, as shown at 10. The portion of the peel plate against which these strips rest is preferably of reduced thickness so that the outer surface of the metallic strip 9 will be flush with the surface of the peel plate, as clearly shown in Fig. 2. The ends of the strips 9 and 10 may be suitably fastened to the peel plate as by rivets 11.

Various changes may be made in the construction as thus described without departing from the spirit of the invention.

What is claimed is:

The herein described peel plate comprising a substantially rectangular flat body having its top and bottom surfaces cut away at its forward end to form shallow recesses, a continuous sheet of asbestos positioned on the end of the body within said recesses, the thickness of which sheet of asbestos is substantially half the depth of the recesses in said body, a sheet of thin sheet metal bent around the end of the body of the peel plate and wholly covering the sheet of asbestos, the outer surfaces of said section of sheet metal lying flush with the corresponding faces of the body of the peel plate, and fastening means extending through the body of the peel plate and through the end portions of the sheet of asbestos and the thin metallic sheet.

In testimony whereof I have signed my name to this specification.

CARL W. LAMPRECHT.